United States Patent [19]

Wadsworth

[11] 4,092,710
[45] May 30, 1978

[54] LASER POWER SUPPLY

[75] Inventor: Gary Earl Wadsworth, Little Rock, Ark.

[73] Assignee: Power Technology, Inc., Little Rock, Ark.

[21] Appl. No.: 748,317

[22] Filed: Dec. 7, 1976

[51] Int. Cl.² ........................................... H02M 3/335
[52] U.S. Cl. ......................................... 363/19; 363/97
[58] Field of Search .................. 321/2, 18; 363/18–21, 363/97

[56] References Cited

U.S. PATENT DOCUMENTS

| 3,316,445 | 4/1967 | Ahrons | 321/2 X |
|---|---|---|---|
| 3,412,311 | 11/1968 | Siedband | 321/2 |
| 3,742,242 | 6/1973 | Morio et al. | 321/2 X |
| 3,840,797 | 10/1974 | Aggen et al. | 321/2 |
| 3,967,159 | 6/1976 | Dendy et al. | 321/2 X |
| 3,986,085 | 10/1976 | Weber | 321/2 X |
| 4,005,351 | 1/1977 | Blum | 321/14 |

*Primary Examiner*—William M. Shoop
*Attorney, Agent, or Firm*—Hill, Gross, Simpson, Van Santen, Steadman, Chiara & Simpson

[57] ABSTRACT

A laser power supply includes a dc to dc converter which feeds a multiplier-rectifier circuit to provide a high dc voltage output. The converter includes a power transistor which is subject to a control of its on time to provide constant current regulation. A smooth regulation is provided by a proper timing of the turn off signal to the power transistor by sampling the emitter signal of a transistor which is included in a synthesized thyristor, the thyristor being operable to hog base current from the power transistor. The converter is coupled to the output multiplier-rectifier by a transformer which has a feedback winding connected in series with the base of the power transistor.

12 Claims, 1 Drawing Figure

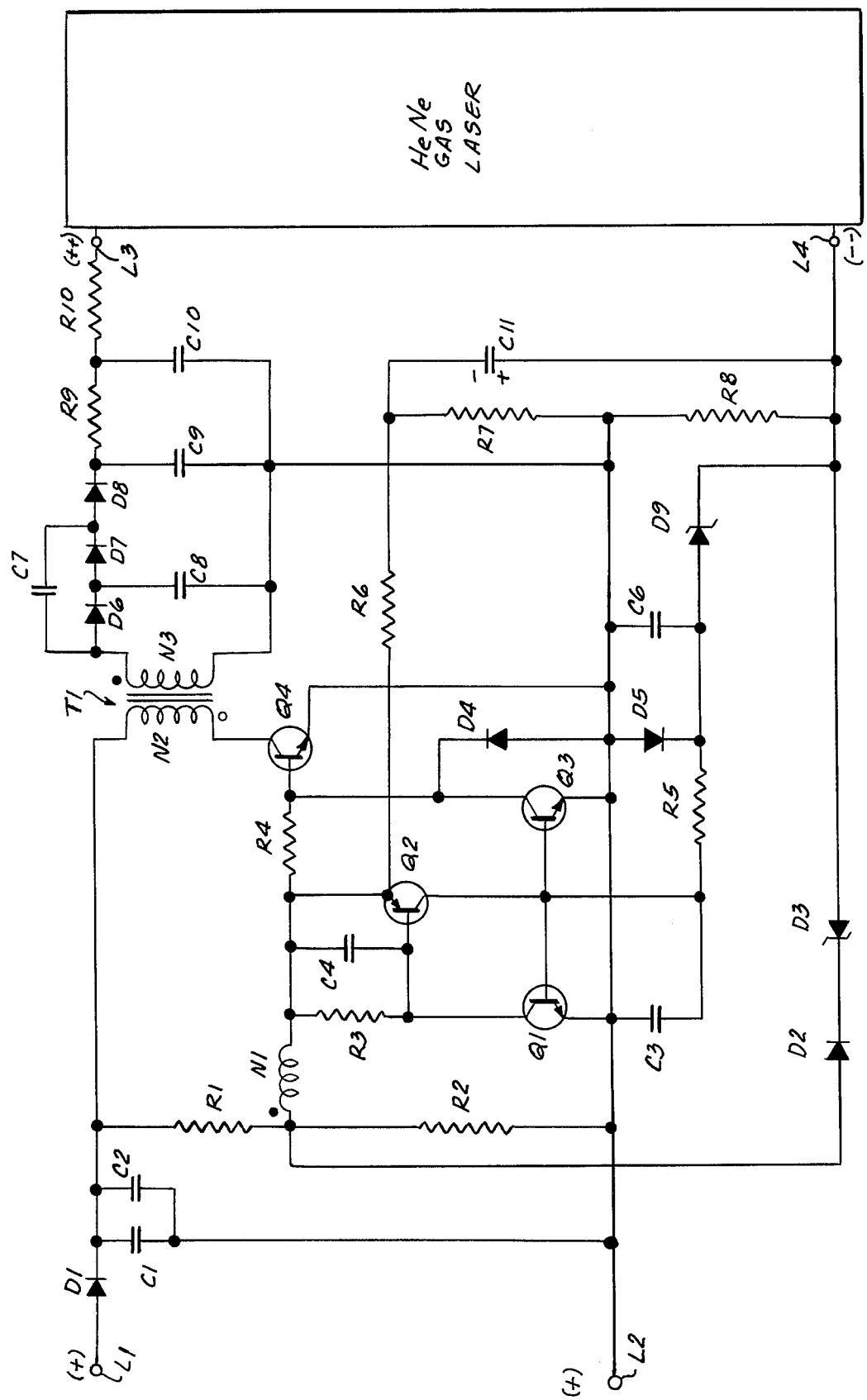

LASER POWER SUPPLY

DESCRIPTION

This invention relates to a high voltage supply, and is more particularly concerned with a laser power supply.

A primary object of the present invention is to provide a high voltage supply as a laser power supply.

Another object of the invention is to provide a high voltage power supply, working from a low voltage dc source and which utilizes a multiplierrectifier configuration, in particular a three diode configuration, which produces a higher efficiency in multiplication than multipliers utilizing more or less diodes.

Another object of the invention is to provide a high voltage supply which has smooth constant current regulation and which is capable of supplying a high voltage, i.e. 10,000 V to a gas laser.

Other objects, features and advantages of the invention, its organization, construction and mode of operation will be best understood from the following detailed description taken in conjunction with the accompanying drawing on which a single FIGURE is a schematic circuit diagram of a high voltage power supply constructed in accordance with the principles of the present invention.

Referring to the drawing, a high voltage power supply is illustrated as comprising a pair of input terminals L1, L2, also referenced (+) and (−), respectively, for connection to a low dc voltage, and a pair of output terminals L3, L4, also referenced (++) and (−−), respectively which are connected to a load, here a gas laser.

The high voltage supply generally comprises a dc to dc converter, a multiplier-rectifier, and sampling circuits for ensuring smooth constant current regulation and the prevention of oscillation of the laser tube.

More specifically, diode D1 is connected to the input terminal L1 and to a pair of parallel connected capacitors C1, C2 which form a low ac impedance for the dc to dc converter. The capacitors C1 and C2 also bypass noise originating in the dc to dc converter and therefore obviate any potential RFI problems.

A pair of resistors R1 and R2 form a voltage divider which supplies starting current to the base of a transistor Q4 by way of a winding N1 and a resistor R4. The winding N1 is one winding of a three winding transformer T1 which includes a saturable core. Additional base drive is supplied by the transformer winding N1, as a feedback connection, driving the transistor Q4 to saturation so as to apply low positive voltage to the transformer winding N2.

During starting, energy is stored in the magnetic field of the transformer T1 until the core thereof saturates. Upon saturation of the core, the base drive of the transistor Q4 drops rapidly to zero, then reverses. Then, energy stored in the transformer core is delivered to the voltage multiplier by way of the transformer winding N3.

After starting, and while in regulation (described below), the transformer T1 is not allowed to reach saturation. In this mode of operation, the on time of the transistor Q4 is terminated by removing the base drive, as determined by the current sensed in the output of the power supply.

After termination of the base drive, the voltage across the transformer reverses ad energy is delivered to the rectifier and load through the winding N3. The multiplier-rectifier comprises three diodes D6, D7 and D8, and a plurality of capacitors C7, C8 and C9. This three diode configuration has been found to produce a higher efficiency than multipliers employing two diodes, as well as multipliers employing four or more diodes.

It is most desirable to provide constant current regulation, and the same is provided by varying the on time of the power transistor Q4. This is accomplished by terminating the base drive to the power transistor Q4 at the proper time, as determined by the voltage level across a current sensing resistor R8. When this level exceeds the breakdown voltage of zener diode D9 an error signal is developed at the junction of the resistor R5 and a diode D5 which increases in a positive direction until the voltage applied to the base of the transistor Q1 through the resistor R5 causes the transistor Q1 to conduct, which, in turn, drives the base of the transistor Q2. This drive further provides a drive for the transistor Q1 and a drive for a transistor Q3. The transistors Q1 and Q2 form a synthesized thyristor which both hogs base current from the winding N1 and drives the transistor Q3, further clamping the base of the transistor Q4 to the emitter thereof.

In order to assure smooth regulation, proper timing of the turn off signal to the transistor Q4 is required. To this end, a ramp and pedestal type waveform is derived by sampling the signal at the emitter of the transistor Q2 and dividing the signal to the proper level through a pair of resistors R6 and R7. The divided signal is then coupled to the sensing circuit for control of base current hogging by way of a capacitor C11.

In order to properly start a gas laser, a high voltage is required, i.e. 10,000 V. This high voltage is derived with no additional high voltage components. The voltage will rise to the desired level under a open circuit condition, but must be regulated to prevent excessive voltage from damaging the power supply. This is accomplished by sampling the voltage that appears across the base drive resistor R2 of the input voltage divider, which voltage is proportional to the voltage appearing across the winding N1, which in turn is proportional to the voltage appearing across the winding N3, and therefore is proportional to the output voltage, however at a greatly reduced potential. The voltage appearing at the junction of the resistor R2 and the winding N1 is compared with the voltage drop across a pair of reference diodes D2 and D3 and is then used to drive the current sensing circuit so that the starting voltage develops a voltage across the current sensing resistor R8 effecting open circuit voltage regulation in the same manner as if a current signal were present.

The capacitor C11 provides an additional function during the starting operation. When the laser tube starts at a high voltage, discharge of the high voltage filter capacitors C9 and C10 would normally develop a high voltage across the current sensing resistor R8, which could cause the regulator to sense a high current condition and turn off completely. This would lead to a relaxation type of oscillation of the laser tube. This oscillation is prevented by selecting the value for the capacitor C11 which is sufficient to absorb the high current pulse created in starting the laser and to delay the start of regulation for a few milliseconds, thus providing a higher than normal operating current to the laser for a brief interval. This high current then tapers smoothly to normal operating current, thus minimizing the tendency of the laser (which has a negative resistance characteristic) to oscillate.

As an example of circuit elements with which one skilled in the art may practice the invention, the following tabulation of components is provided.

| Reference Character | Value or Identification |
|---|---|
| R1 | 240 ohms |
| R2 | 22 ohms |
| R3 | 1.2 k-ohm |
| R4 | 2.2 ohms |
| R5 | 39 ohms |
| R6, R7 | 27 ohms |
| R8 | Selected |
| R9 | 8.2K ohms |
| R10 | 1K ohm |
| C1 | 220 µf |
| C2 | 100 µf |
| C3 | 330 pf |
| C4 | .0068 µf |
| C6 | .0047 µf |
| C7 | .002 µf |
| C8 | .002 µf |
| C9 | .002 µf |
| C10 | .002 µf |
| C11 | 10 µf |
| D1 | 3 Al |
| D2, D5 | 1N4148 |
| D3 | 1N753A |
| D4 | ED5752 |
| D6 | DR1200 |
| D7 | DR1200 |
| D8 | DR1200 |
| Q1, Q3 | 3569 |
| Q2 | 3645 |
| Q4 | MJE3055 |
| T1 | Turns ratio N1:N2:N3 is 2:5:400 |

Although the invention has been described by reference to a particular illustrative embodiment thereof, many changes and modifications of the invention may become apparent to those skilled in the art without departing from the spirit and scope of the invention. It is therefore intended that the patent warranted hereon include all such changes and modfications as may reasonably and properly be included within the scope of this contribution to the art.

I claim:
1. A high voltage supply circuit, comprising:
an input for connection to a low voltage dc supply and an output for connection to a laser;
a dc to dc converter connected to said input and including power transistor means operable in response to the application of low dc voltage to produce a converter output signal;
voltage increasing means connected to said output;
coupling means connected between said converter and said voltage increasing means coupling said converter signal to said voltage increasing means, said coupling means including a feedback connection to the input side of said converter to provide an increase in the drive of said power transistor means; and
constant current regulation means including current sensing means connected to said power transistor and current hogging means including a pair of transistors connected as a synthesized thyristor, said current hogging means connected to said power transistor and operable to control the on time of said power transistor.

2. The circuit of claim 1, comprising:
a regulation timing control means comprising means connected to said current hogging means and to said sensing means to include in the on time control a sampling of the operation of said current hogging means.

3. The circuit of claim 1, wherein said coupling means comprises a transformer.

4. The circuit of claim 3, wherein said transformer includes a saturable core.

5. The circuit of claim 3, wherein said feedback connection includes a winding of said transformer.

6. The circuit of claim 1, wherein said voltage increasing means includes a voltage multiplier.

7. The circuit of claim 1, wherein said coupling means comprises a transformer including primary and secondary windings, and said voltage increasing means comprises a voltage multiplier connected between said secondary output and said output.

8. The circuit of claim 7, wherein said multiplier comprises three serially connected diodes connected between said secondary and said output.

9. A high voltage supply circuit, comprising:
a pair of input terminals for connection to a low voltage dc supply and a pair of output terminals for providing a high dc output voltage;
capacitance means connected across said input terminals as a low impedance ac shunt;
voltage divider means connected across said input terminals including a tap;
a power transistor including a base connected to said tap, and a collector-emitter circuit connected between said input terminals, and operable to conduct in response to the application of low dc voltage to said input terminals;
a transformer connected with said power transistor to form a blocking oscillator and including a saturable core and first, second and third windings, said second winding connected between the collector-emitter circuit of said power transistor and one of said input terminals, said first winding connected between said tap and said base of said power transistor to feed back additional drive current thereto;
voltage multiplier-rectifier means connected across said third winding and said output terminals, said multiplier-rectifier means including a plurality of diodes serially connected between one terminal of said third winding and one of said output terminals;
reference signal forming means;
output signal sampling means connected to said output terminals; and
comparison means connected to said reference signal forming means and said output signal sampling means and connected to a point between said first winding and said base of said power transistor and operable to remove the base drive from said power transistor in response to the sampled signal exceeding the reference signal.

10. The circuit of claim 9, comprising resistance means connected between the other of said input terminals and the other of said output terminals, and synthesized thyristor means including a pair of transistors connected to said resistance means and to said base of said power transistor to hog base current and clamp said base to the emitter of said power transistor in response to a predetermined level developed at said resistance means.

11. The circuit of claim 10, wherein said synthesized thyristor means comprises:
first and second transistors each comprising a base, a collector and an emitter, said base of each said transistor connected to said collector of the other of said first and second transistors, said emitter of said first transistor connected to said base of said power transistor and said emitter of said second transistor connected to the other of said input terminals; and said resistance means to the other of said output terminals.

12. The circuit of claim 11, comprising a third transistor including a base connected to said base of said second transistor and a collector-emitter circuit connected between said base of said power transistor and said resistance means to clamp the base to the emitter of said power transistor in response to said predetermined level.

* * * * *